Aug. 18, 1953 A. ELLETT 2,649,498

BLANKING ARRANGEMENT FOR SUBSCRIPTION TELEVISION RECEIVERS

Filed March 3, 1949 4 Sheets-Sheet 1

ALEXANDER ELLETT
*INVENTOR.*

BY [signature]

HIS AGENT

Aug. 18, 1953 A. ELLETT 2,649,498

BLANKING ARRANGEMENT FOR SUBSCRIPTION TELEVISION RECEIVERS

Filed March 3, 1949 4 Sheets-Sheet 2

ALEXANDER ELLETT
INVENTOR.

BY Bruce G. Buchard

HIS AGENT

Aug. 18, 1953 A. ELLETT 2,649,498

BLANKING ARRANGEMENT FOR SUBSCRIPTION TELEVISION RECEIVERS

Filed March 3, 1949 4 Sheets-Sheet 3

ALEXANDER ELLETT
INVENTOR.
BY [signature]
HIS AGENT

ALEXANDER ELLETT
INVENTOR.
BY Bruce Birchard
HIS AGENT

Patented Aug. 18, 1953

2,649,498

UNITED STATES PATENT OFFICE 2,649,498

BLANKING ARRANGEMENT FOR SUBSCRIPTION TELEVISION RECEIVERS

Alexander Ellett, River Forest, Ill., assignor to Zenith Radio Corporation, a corporation of Illinois Application March 3, 1949, Serial No. 79,425

3 Claims. (Cl. 178—5.1)

Figure 1:
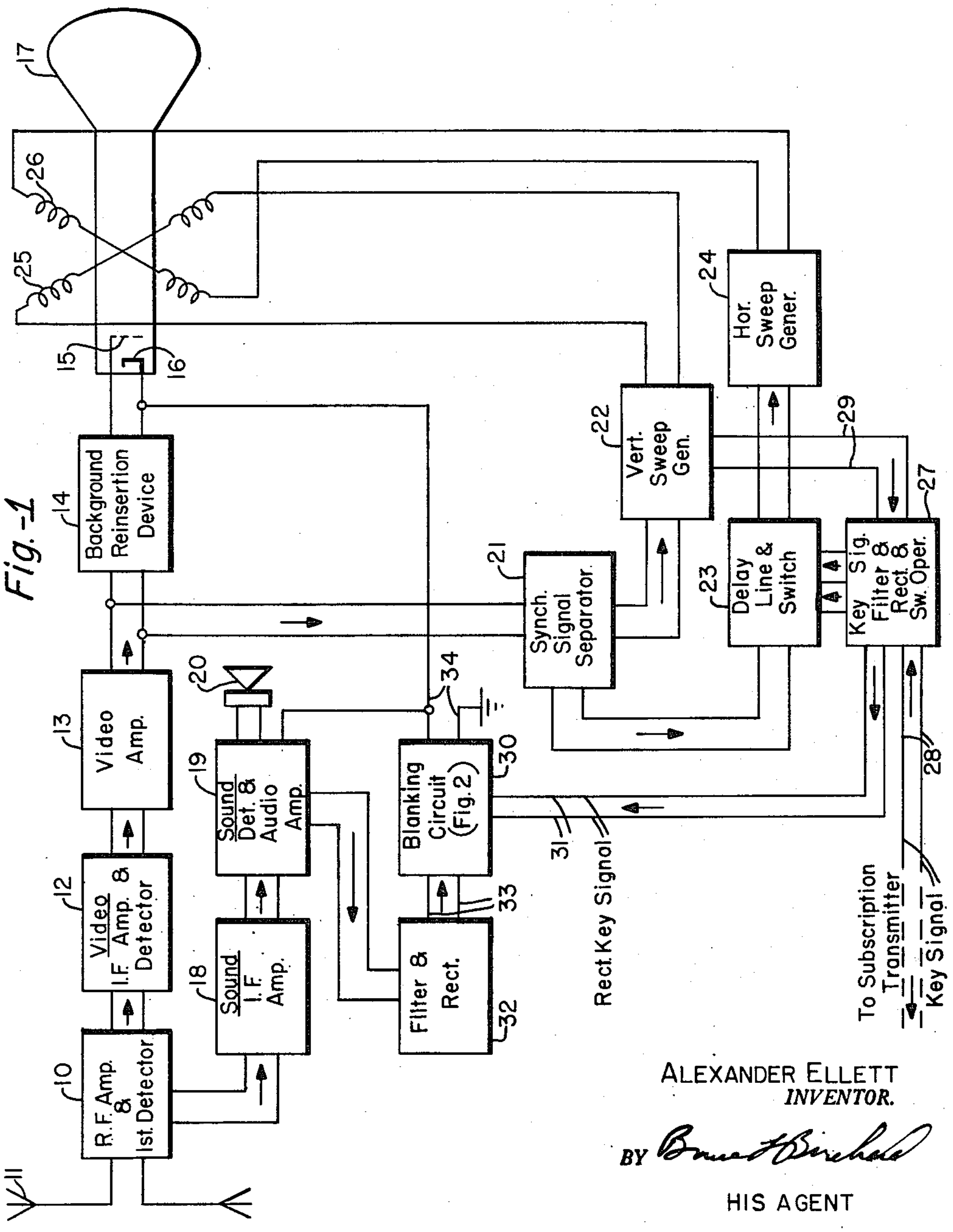

This invention relates to television receivers capable of decoding subscription type coded television signals received over a first signal channel in which the decoding is effected in response to appropriate decoding or key signals received over a second signal channel.

Copending application Serial No. 773,848, entitled "Image Transmission System" by Erwin M. Roschke, filed September 13, 1947, now U. S. Patent No. 2,547,598, issued April 3, 1951, and assigned to the present assignee discloses a subscription television signalling system of the type to which the present invention may be applied. In the Roschke system a coded television signal is radiated to subscriber receivers and a key signal suitable for decoding the television signal is transmitted to these receivers over a line circuit, such as a telephone line. The coding of the television signal is accomplished by altering at spaced time intervals the time relation between the line trace and line retrace periods in which the video-frequency components and the synchronizing-signal components, respectively, of this signal are transmitted. The key signal, transmitted to the subscriber receivers over existing telephone lines, indicates the times of occurrence of such alterations in the television signal, so that appropriate correcting apparatus may be actuated at the receiver to decode the television signal, and thus enable the receiver to reproduce the image represented by the television signal. In this system, when a receiver is tuned to intercept the coded television signal but, for some reason, the key signal is not received, the image reproduced on the screen of the image tube moves rapidly back and forth, and a "jittered" effect is produced.

The present invention is directed to a system for blanking the image tube in a receiver during any operating interval in which a subscription type television signal is received but in which the decoding signal is not received. This blanking action ceases when the appropriate key signal for decoding the television signal is requested and received. In this manner, a "jittered" image never appears on the screen of the image tube.

It is therefore, an object of this invention to provide a system for blanking the image reproducing tube of a television receiver, whenever that receiver receives a subscription type coded television signal but not the appropriate key signal required for proper utilization of the coded signal.

Copending application Serial No. 52,909, entitled "Coded Sound Signalling System," filed October 5, 1948, by George O. Striker, now U. S. Patent No. 2,551,068, issued May 1, 1951, and assigned to the present assignee, discloses a system in which the sound-frequency components of a subscription television signal are coded. The decoding of these sound-frequency components at a subscriber receiver is accomplished upon the receipt of a suitable decoding or key signal. The present invention may be applied to such a system and utilized for muting the sound channel of the receiver during any operating interval in which a subscription type of television signal is received but in which the decoding signal is not received. Therefore, through the use of this invention the sound channel never passes the sound-frequency components in their coded form to the sound reproducing device, and this device never reproduces the discordant sounds represented by these coded components.

It is, therefore, a further object of this invention to provide a system for use in a television receiver, by means of which the sound channel thereof is muted whenever the receiver is tuned to receive a subscription type television signal, this muting being removed only when the appropriate key signal for decoding the television signal is received.

Figure 2:
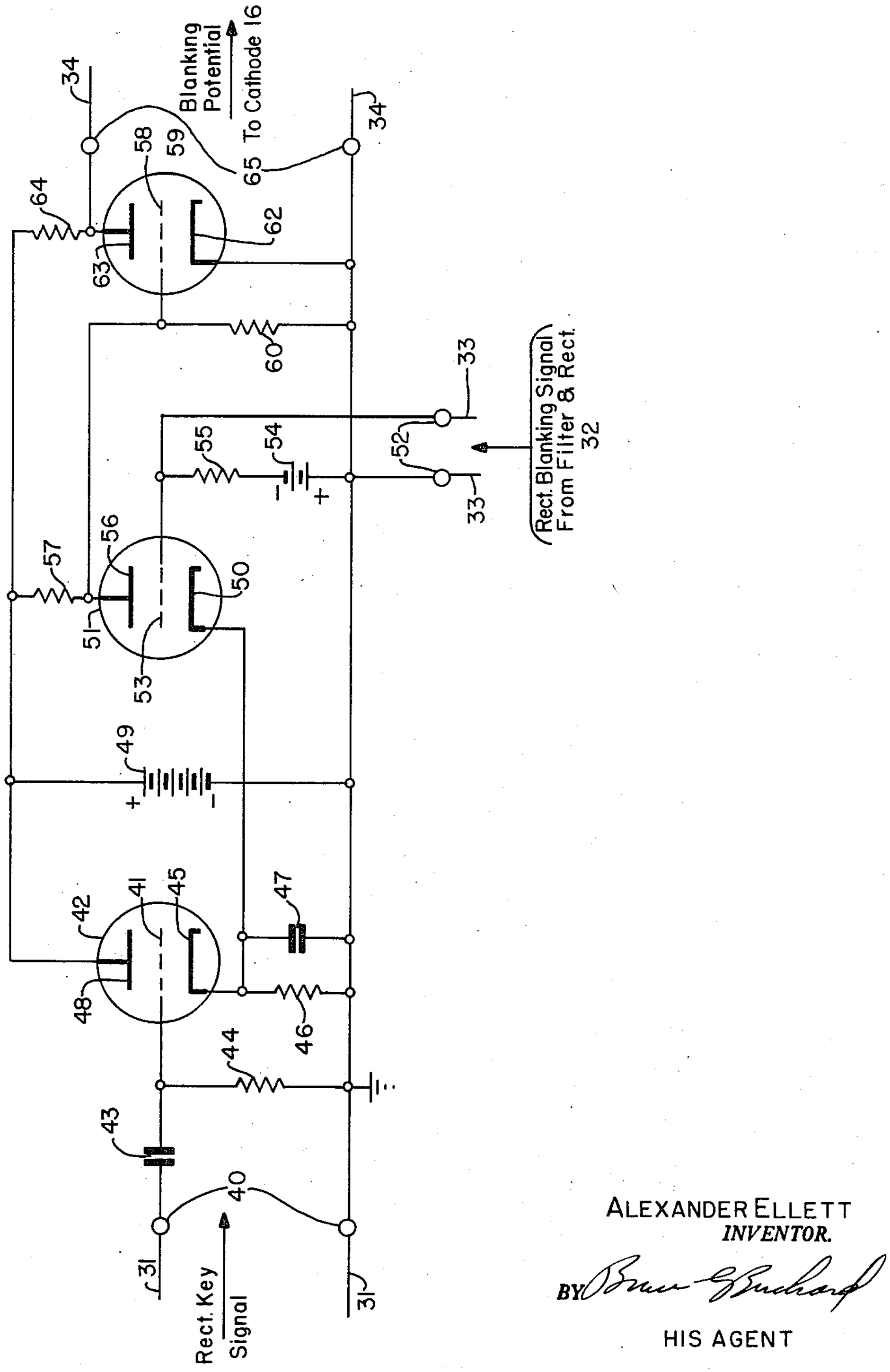
Figure 3:
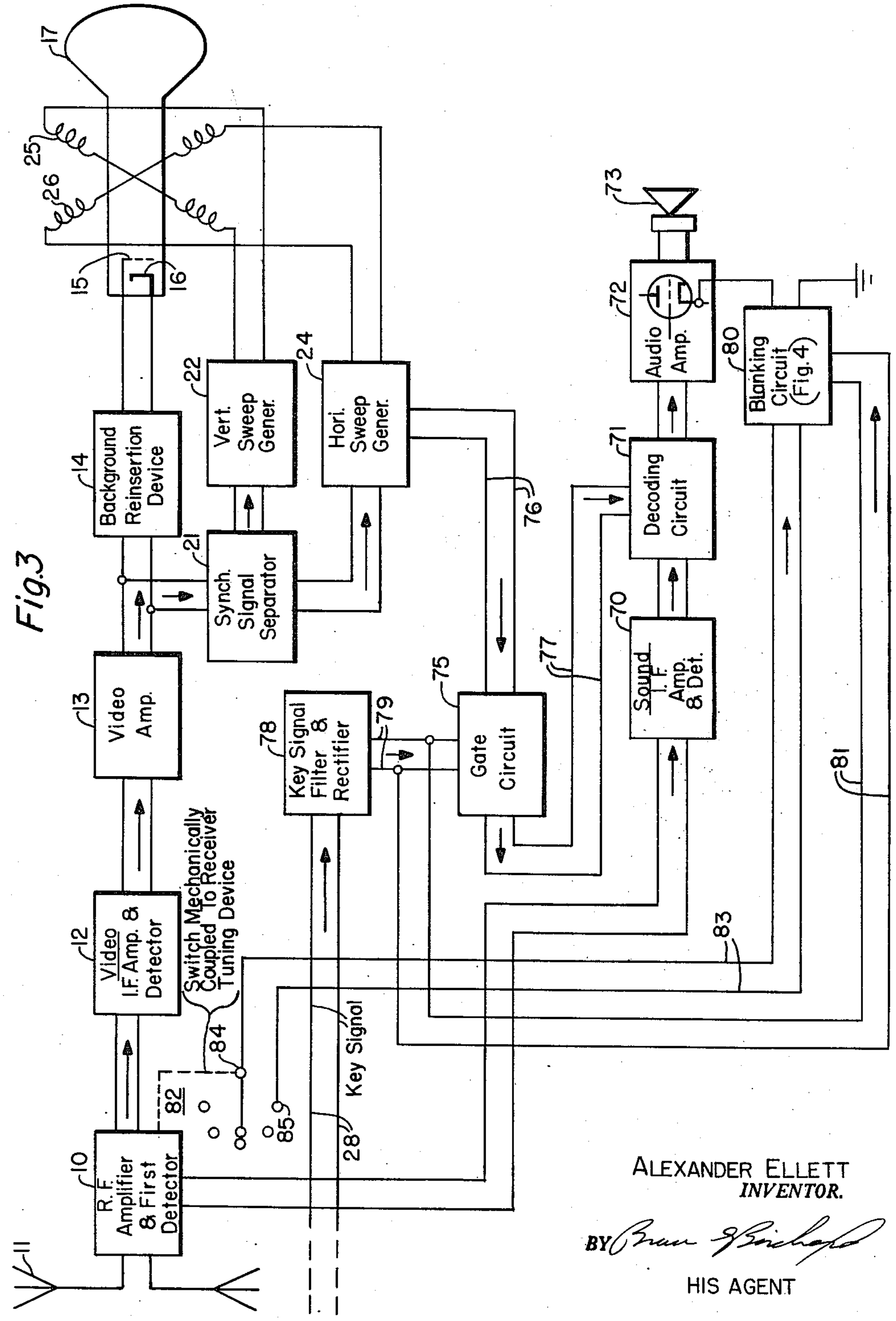
Figure 4:
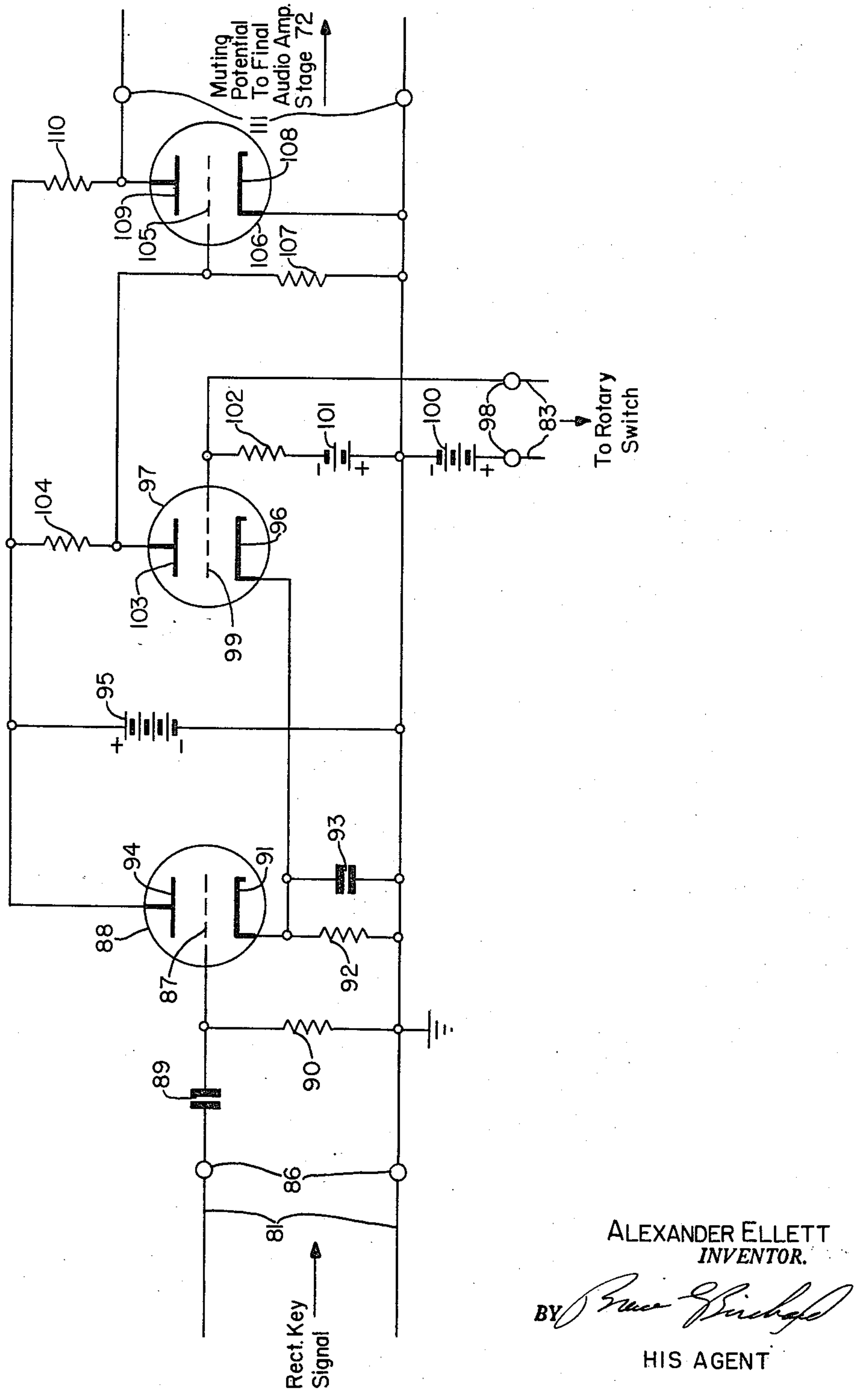

The features of this invention which are believed to be new are set forth with particularity in the appended claims. The invention itself, however, together with further objects and advantages thereof may best be understood by reference to the following description when taken in conjunction with the accompanying drawings, in which:

Figure 1 shows a subscriber television receiver incorporating one embodiment of the present invention, Figure 2 shows a circuit diagram of this embodiment, Figure 3 shows a second type of subscriber receiver incorporating another embodiment of the invention, and, Figure 4 shows a circuit diagram of the embodiment utilized in the receiver of Figure 3.

The subscriber television receiver shown in Figure 1 is similar to that disclosed in the aforementioned Roschke application, but includes a blanking circuit which, in accordance with the present invention, blanks the image-reproducing tube during any operating interval in which the receiver intercepts a subscription type coded television signal but does not concurrently receive the required key signal for decoding the television signal. The receiver of Figure 1 includes a radio-frequency amplifier and first detector 10, the input terminals of which may be connected to a suitable antenna 11. The output terminals of the stage 10 are connected to the video channel and to the sound channel of the receiver. The video channel includes the usual intermediate-frequency amplifier and detector 12. The output terminals of the detector portion of the stage 12 are connected to a video amplifier 13, which, in turn, is connected through a background reinsertion device 14, to the control electrode 15, and to the cathode 16 of an image-reproducing tube 17. The sound channel of the receiver comprises the usual intermediate-frequency amplifier 18 which is connected to a detector and audio amplifier 19, the output terminals of the stage 19 being connected to a suitable sound reproducing device 20. The output terminals of the video amplifier 13 are connected to a synchronizing signal separator 21 which, in turn, is connected directly to a vertical sweep generator 22, and through a delay line and switch 23 to a horizontal sweep generator 24. The vertical sweep generator 22 and horizontal sweep generator 24 are connected respectively to the vertical deflection coils 25 and horizontal deflection coils 26 of the image tube 17. The delay line and switch 23 is controlled by a key signal filter and rectifier and switch operator 27, this operator being connected to a line circuit 28 which extends to the subscription transmitter. The switch operator 27 is also connected to the vertical sweep generator 22 by way of leads 29, and to a blanking circuit 30 by way of leads 31. Input terminals of the blanking circuit 30 are connected to a filter and rectifier 32 by way of leads 33; and the output terminals of this circuit are connected to the cathode 16 of the image tube 17 by way of leads 34, and also to the detector and audio-amplifier unit 19. The filter and rectifier 32 is also connected to the sound detector and audio-amplifier unit 19, as shown.

When the receiver is tuned to accept a subscription type coded television signal intercepted by the antenna 11, this signal is amplified and heterodyned to the selected intermediate-frequency of the receiver, in the radio-frequency amplifier and first detector 10. The video intermediate-frequency signal is amplified and detected in the intermediate-frequency amplifier and detector 12, and the resulting video signals are amplified in the video amplifier 13, and suitably adjusted as to background level by the reinsertion device 14. The signals from the device 14 are impressed between the control electrode 15 and cathode 16 of the image tube 17 to control the intensity of the cathode ray in this tube, in the usual manner. The synchronizing-signal components are removed from the received television signal by means of the synchronizing-signal separator 21, and the vertical synchronizing signals are impressed directly on the vertical sweep generator 22 to control this generator and, hence, the vertical deflection of the image tube 17. The horizontal synchronizing signals are supplied to the horizontal sweep generator 24 through the delay line and switch 23 to control this generator and, hence, the horizontal deflection of the image tube 17.

It will be assumed that the received television signal is coded and that the coding is accomplished at the transmitter by altering at spaced time intervals the time relation between the video-frequency components and the horizontal synchronizing signal components thereof. The delay line and switch 23 is operated between two positions; a first, in which the horizontal synchronizing signals are passed to the horizontal sweep generator 24 with no delay, and a second in which the horizontal synchronizing signals are passed to the generator 24 with a time delay corresponding to the alteration in time relation between the video-frequency components and the horizontal synchronizing-signal components of the received signal. Therefore, when the delay line and switch 23 is operated at the spaced time intervals of the alteration in the received signal, the timing of the horizontal deflection of the tube 17 is altered a corresponding amount, and in an opposite sense to compensate for such alteration, and the image represented by the received television signal is reproduced on the screen of the image tube 17.

The delay line and switch 23 is controlled by the switch operator 27. This operator receives the key signal over the line circuit 28, this signal preferably being in the form of bursts of oscillations which occur during the spaced time intervals in which the timing between the video-frequency components and the horizontal synchronizing-signal components of the received television signal has been altered. In addition to these bursts of key signal, the operator 27 receives vertical blanking pulses from generator 22 and, under the conjoint control of the applied signals, operates delay line and switch 23 during vertical retrace intervals to effect decoding of the received television signal. In this manner, since changes in timing between the video-frequency components and the horizontal synchronizing-signal components from one mode to the other occur during vertical retrace intervals, there is no distortion of the reproduced image, as would be the case if such changes occurred during trace intervals. The receiver thus far described is fully disclosed in the aforementioned Roschke application, and a further description is deemed to be unnecessary. It is noted that when the receiver is tuned to receive a conventional non-subscription television signal and no key signal is received over the line 28, the delay line and switch 23 is in the position in which the horizontal synchronizing signals are passed therethrough with no delay, and the picture tube 17 reproduces the image represented by such television signal.

The sound-frequency components of the subscription television signal are amplified in the intermediate-frequency amplifier 18, and detected and again amplified in the detector and audio amplifier 19, the amplified audio signals being reproduced in the reproducing device 20. It will be further assumed that the sound carrier wave of the subscription television signal is modulated with a blanking signal having a preselected frequency outside of the audio band. This blanking signal is selected from the sound carrier wave and is rectified by means of the filter and rectifier 32. The rectified blanking signal is supplied to the blanking circuit 30, which thereupon applies a blocking potential to the input circuit of the receiver image tube 17 so that this tube does not reproduce the received television signal. Therefore, when the receiver is tuned to a subscription type of television signal, a rectified signal appears at the output of unit 32. Moreover, if the appropriate key signal is not concurrently received over the line 28, the blanking circuit 30 is actuated to blank the image tube 17. This blanking of the image tube continues until the required key signal is requested and received over the line circuit 28, at which time the blanking is removed from the image tube 17, in a manner to be described. Thereafter, this tube reproduces the corrected image represented by the received subscription television signal.

In subscription systems of the type disclosed in the aforementioned application Serial No. 52,909, coding of the sound-frequency components is effected by heterodyning these components into a range of frequencies outside the normal sound signal range. In such systems, these coded sound components may be used to control the blanking circuit 30, and no additional blanking signal is necessary in the television signal, it being merely necessary to arrange the filter and rectifier so that it accepts signals solely in the frequency range of the coded sound-frequency components. It is apparent, that conventional uncoded television signals received by the present system have no effect on the blanking circuit 30 as the uncoded sound-frequency components associated therewith are not accepted by the filter and rectifier 32.

The blanking circuit 30 is shown connected also to the detector and audio amplifier unit 19 to apply the developed blocking potential to the cathode of one of the electron discharge devices included in the sound channel. In this manner, the sound reproducing device 20 is also effectively muted during the intervals when the image-reproducing tube 17 is blanked.

The blanking signal has been described as modulated on the sound carrier wave of the received subscription television signal and selected from the sound channel of the receiver. However, it is to be understood that this blanking signal may be transmitted with the subscription television signal modulated on the video carrier wave, or in any other suitable manner.

The blanking circuit 30 is shown in detail in Figure 2. Referring to this figure, the terminals 40 are connected by way of leads 31 to the key signal filter and switch operator 27 of Figure 1. One of the terminals 40 is grounded and the other is coupled to the control electrode 41 of an electron discharge device 42 through a coupling capacitor 43, the control electrode 41 being connected to ground through a grid-leak resistor 44. The cathode 45 of the device 42 is connected to ground through a resistor 46, shunted by a capacitor 47. The anode 48 of the device 42 is connected to the positive terminal of a source of unidirectional potential 49, the negative terminal of this source being grounded. The cathode 45 is further connected to the cathode 50 of an electron discharge device 51. The terminals 52 are connected by way of leads 33 to the filter and rectifier 32 of Figure 1. One of the terminals 52 is grounded, and the other is connected to the control electrode 53 of the device 51. The control electrode 53 is connected to the negative terminal of a biasing source 54 through a resistor 55, the positive terminal of this source being grounded. The anode 56 of the device 51 is connected to the positive terminal of the source 49 through a resistor 57, and this anode is further connected to the control electrode 58 of an electron discharge device 59. The control electrode 58 is connected to ground through a grid-leak resistor 60. The cathode 62 of the device 59 is connected to ground, and the anode 63 of this device is connected to the positive terminal of the source 49 through a resistor 64. The anode 63 is further connected to one of the output terminals 65, the other of these terminals being grounded. The ungrounded terminal 65 is connected to the cathode 16 of the image tube 17 of Figure 1 by way of the ungrounded lead 34.

When the receiver is tuned to receive a conventional uncoded television signal, no signal appears across the terminals 52 from the filter and rectifier 32 of Figure 1 because the ordinary broadcast does not include the blanking signal to which unit 32 responds. Also, no rectified key signal appears across the terminals 40 for the reason that there is no line signal during nonsubscription broadcasts. Device 42 is normally slightly conductive, and cathode 45 of this device together with cathode 50 of device 51, therefore, have a certain positive potential value. Due to the negative bias from the source 54 on the control electrode 53, the device is non-conductive. Device 59, on the other hand, is highly conductive due to the positive bias on the control electrode 58 impressed thereon because of the relatively high potential value of anode 56 of the device 51. The anode 63 of the device 59 is only slightly positive relative to ground potential, and there is a correspondingly small potential difference between the leads 34. The operating potentials of the image tube 17 are selected in well known manner so that the application of the small positive potential to the cathode 16 is not sufficient to blank this tube, that is, to bias the tube to cut-off. Consequently, the image represented by the received uncoded television signal is reproduced on the screen thereof.

When the receiver is tuned to receive a subscription type coded television signal, but the subscriber has not as yet requested that he be supplied with the key signal required to decode this signal; no rectified key signal appears across the terminals 40, but a rectified blanking signal of positive polarity from the filter and rectifier 32 of Figure 1 appears across the terminals 52. The amplitude of the rectified blanking signal appearing across terminals 52, and applied to the control electrode 53 of the device 51, is sufficient to overcome the bias of the source 54 to render device 51 highly conductive. The increased potential drop across the anode resistor 57 reduces the conductivity of device 58, and the anode 63 assumes an increased potential value. Hence, a substantial positive potential exists between the leads 34, and this potential is sufficient to bias the cathode 16 of the image tube 17 so that this tube is efficiently blanked. Therefore, under these conditions, no image appears on the screen of the image tube 17.

However, when the subscriber requests and receives the required key signal in conjunction with the coded television signal, rectified positive polarity bursts of this signal are impressed across the terminals 40. The time constant of the cathode circuit of device 42, consisting of the resistor 46 and capacitor 47, is long compared with the maximum separation of succeeding bursts of the key signal so that these rectified bursts cause the cathode 45 of tube 42 and the cathode 50 of device 51 to have a relatively high and substantially constant positive potential throughout the subscription program. This increased potential on the cathode 50 is sufficient to render the device 51 non-conductive. Therefore, the device 59 becomes highly conductive, and the resulting decrease in potential of the anode 63 decreases the potential between the leads 34. This decreased potential between the leads 34 is insufficient to blank the image tube 17. Thus, when the key signal is received along with the coded television signal, the image tube 17 correctly reproduces the image represented by the received subscription television signal.

As previously mentioned, the control potential derived from the blanking circuit 30, during operating intervals when the required key signal is not received, may be applied to the cathode of a discharge device in the sound channel unit 39 to mute the sound reproducing device 20 during these intervals. Therefore, by means of the blanking circuit 30 the image tube 17 and the sound reproducing device 20 may be blocked either separately or together during these intervals.

Figure 3 shows a second type of blanking, or muting, circuit. The blanking circuit shown in this figure is connected to a switch mechanically coupled to the receiver tuning device, and functions whenever the receiver is tuned to a particular signal channel. The utility of this embodiment is limited to situations wherein the television signal received on the particular channel is of the coded subscription type at all times, and wherein the channel is not used alternately for the transmission of coded subscription signals and uncoded television signals. Furthermore, the embodiment of the invention of Figure 3 is shown as applied to a receiver similar to that disclosed in the aforementioned Striker application in which the sound-frequency components of the received television signal are coded, and acts to mute effectively the sound reproducing device of the receiver during intervals when the receiver is tuned to the particular channel, and for any reason the key signal required to decode the sound-frequency components is not received. It is to be understood, however, that the muting system of Figure 3 could quite conveniently be used to blank the receiver image reproducing during such intervals, if so desired.

The receiver of Figure 3 is in many respects similar to that of Figure 1, and includes a radio-frequency amplifier and first detector 10 coupled to an antenna 11, a video intermediate-frequency amplifier and detector 12, a video amplifier 13 and a background reinsertion device 14, these stages being connected in cascade as previously. The output terminals of the device 14 are connected between the control electrode 15 and cathode 16 of an image tube 17. The video amplifier 13 is connected to a synchronizing-signal separator 21, which in turn is connected to a vertical sweep generator 22 and to a horizontal sweep generator 24. The vertical sweep generator 22 is connected to the vertical deflection coils 25 of the image tube 17, and the horizontal sweep generator 24 is connected to the horizontal deflection coils 26 of this tube.

The receiver thus far described in quite conventional, and television signals received on the antenna 11 are amplified and heterodyned to the selected intermediate frequency of the receiver in the stage 10. The video intermediate-frequency signals from the stage 10 are amplified and detected in the intermediate-frequency amplifier and detector 12, and the resulting video signals are amplified by the amplifier 13. These signals, suitably adjusted as to background level by the device 14, are used to control the intensity of the cathode ray in the image tube 17. The synchronizing signals are removed from the video signal by means of the separator 21, and the vertical synchronizing signal is impressed on the vertical sweep generator 22, while the horizontal synchronizing signal is supplied to the horizontal sweep generator 24, thereby controlling these generators and the deflection of the cathode ray in the image tube 17.

The stage 10 is also connected to a sound intermediate-frequency amplifier and detector 70, and the output terminals of this detector are connected to a decoding circuit 71. The decoding circuit 71 is coupled to an audio amplifier 72 which in turn is connected to a sound reproducing device 73. A sine wave having the frequency of the horizontal synchronizing signal is obtained from the horizontal sweep generator 24 and impressed on a gate circuit 75 by way of leads 76. The output terminals of the gate circuit 75 are connected to the decoding circuit 71 by way of leads 77. As previously, bursts of key signal are received from the subscription transmitter over the line circuit 28, and these bursts are rectified in a key signal filter and rectifier 78. The output terminals of the rectifier 78 are connected to the gate circuit 75 by means of leads 79, and these terminals are also connected to the input terminals of a blanking circuit 80 by way of leads 81. The blanking circuit 80 has further terminals connected to a rotary switch 82 by means of leads 83. The switch 82 is mechanically coupled to the receiver tuning device, and one of the leads 83 is connected to the movable arm 84 of this switch, while the other is connected to a contact 85 thereof. Whenever the receiver is tuned from one signal channel to another, the movable arm 84 connects with the various contacts of this switch, and when the receiver is tuned to receive a subscription type coded television signal the arm 84 connects with the contact 85, thus closing the connection across the leads 83.

The particular receiver represented in Figure 3 is adapted to decode a subscription television signal of the type in which only the sound-frequency components thereof are coded. A system of that type is described in the aforementioned Striker application, wherein coding of the sound-frequency component is effected by heterodyning this component at the transmitter with a signal having the frequency of the horizontal synchronizing-signal component of the television signal. Therefore, at the receiver it is necessary to produce an identical signal to decode the sound-frequency component. This decoding signal may be obtained from the horizontal sweep generator 24 and is impressed on the decoding circuit 71 through a gate circuit 75. When the key signal is received over the line circuit 28 and rectified in the rectifier 78, the gate circuit 75 is energized to pass the decoding signal and the reproducing device 73 reproduces the sound-frequency components of the received television signal as more particularly explained in the Striker application.

Should the receiver be tuned to receive the coded television signal during a period when no key signal is received on the line circuit 28, the gate circuit 75 does not pass the decoding signal and the sound-frequency component is delivered to the reproducing device 73 in its coded form, resulting in unintelligible sound. To avoid this, the blanking circuit 80, in the absence of the rectified key signal on leads 81 mutes one of the stages of the amplifier 72, and no signal is reproduced by the device 73 until the rectified key signal is impressed on the circuit 80 by means of the leads 81. It is noted that when the receiver is tuned to receive a conventional non-subscription signal, and no key signal is received on the line 28, the gate circuit 75 does not pass the decoding signal from leads 76 to leads 77. Therefore, no decoding signal is impressed on the decoding circuit 71, and this circuit acts as a conventional amplifier and passes the uncoded sound components from stage 70 to the audio amplifier 72.

The blanking circuit 80 of Figure 3 is shown in detail in Figure 4. It includes terminals 86 connected to the key signal rectifier 78 of Figure 3 by means of the leads 81. One of the terminals 86 is grounded and the other is coupled to the control electrode 87 of an electron discharge device 88 through a coupling capacitor 89, this control electrode being connected to ground through a grid leak resistor 90. The cathode 91 of the device 88 is connected to ground through a resistor 92 shunted by a capacitor 93. The anode 94 of the device 88 is directly connected to the positive terminal of a source of unidirectional potential 95, the negative terminal of this source being grounded. The cathode 91 of the device 88 is connected to the cathode 96 of an electron discharge device 97.

A second pair of terminals 98 is connected to the contact 85 and the movable arm 84 of the rotary switch 82 of Figure 3 by means of the leads 83. One of the terminals 98 is connected to the control electrode 99 of the device 97, and the other is connected to the positive terminal of a unidirectional potential source 100, the negative terminal of this source being grounded. The control electrode 99 is also connected to the negative terminal of a biasing source 101 through a resistor 102, the positive terminal of this source being grounded. The anode 103 of the device 97 is connected to the positive terminal of the source 95 through a resistor 104, and this anode is further connected to the control electrode 105 of the device 106. The control electrode 105 is connected to ground through a grid-leak resistor 107, and the cathode 108 of this device is connected directly to ground. The anode 109 of the device 106 is connected to the positive terminal of the source 95 through a resistor 110, and this anode is further connected to one of the output terminals 111, the other of which is connected to ground. The terminals 111 are connected between ground and the cathode of the discharge device in the audio amplifier 72 of Figure 3.

When the receiver is tuned to a conventional, non-subscription television transmitting station, no rectified key signal appears across the terminals 86, and the position of the rotary switch 82 is such that the terminals 98 are open circuited. Under these conditions, the device 97 is non-conductive due to the negative bias on the control electrode 99 from the biasing source 101. Accordingly, the control electrode 104 of the tube 105 is at a relatively high positive potential and the device 106 is highly conductive. The potential of the anode 109 is only slightly above ground potential and the potential across terminals 111 is insufficient to mute the device of the audio amplifier 72 of Figure 3. Thus, the reproducing device 73 is permitted to reproduce the audio signals accompanying the received television signal.

When the receiver is tuned to the subscription television signal channel, the arm 84 of the switch 82 of Figure 3 engages the contact 85. If, when the receiver is tuned to this channel, the key signal required to decode the subscription signal is not received, no signal appears across the terminals 86. By reason of the switch 82 closing the circuit between the terminals 98, a positive bias from the source 100 is impressed upon the control electrode 99, and this positive bias overcomes the negative bias from the source 101, and the device 97 becomes highly conductive. The potential drop across the resistor 104 is now increased, and the space current flowing through the device 106 is materially decreased. The potential of anode 109 increases, and the potential across the terminals 111 is correspondingly increased. The muting potential thus presented at terminals 111 is utilized as a cathode biasing potential for a discharge device in the audio amplifier 72 of Figure 3 to bias that device to cut-off and effectively mute this amplifier. Under such conditions, the reproducing device 73 does not reproduce the coded audio signals.

However, when the required key signal is requested and received jointly with the coded signal, bursts of rectified key signal having a positive polarity appear across the terminals 86. The time constant of the cathode network 92, 93 is long relative to the maximum separation of succeeding bursts of the rectified key signal, and these bursts cause the potential of cathode 91 of device 88, and cathode 96 of device 97 to increase. The increased positive bias on the cathode 96 is sufficient to render the device 97 non-conductive, and the device 106 highly conductive. The potential across the terminals 111 is again reduced to such a value that the amplifier 72 of Figure 3 is no longer muted, and the reproducing device 73 reproduces the decoded audio signals.

The circuit of Figure 3 shows the switch 82 of Figure 3 with leads 83 connected between the arm 84 and a single contact 85. It is evident, however, that when there is more than one subscription signal channel, the leads 83 may be connected to each contact in the switch corresponding to a subscription signal channel.

This invention provides, therefore, blanking or muting circuits for use in a television receiver, whereby the receiver is initially blanked or muted, or both, whenever it is tuned to receive a subscription television signal, and this blocking of the receiver is removed only when the key signal required to decode the television signal is requested and received. Therefore, distorted images are not reproduced on the screen of the receiver image tube, and discordant sounds are not reproduced by the sound reproducing device whenever the receiver is tuned to a subscription signal and the decoding key signal is not also received.

The invention has been described in conjunction with television receivers, since the usual subscription type of signalling system is of the television type. However, it is apparent that the muting circuits described herein may be used in such systems where sound signals only are transmitted, and as shown particularly in Figure 3, the sound signal receiver may be muted whenever it is tuned to a subscription sound signal channel, until the appropriate key signal for decoding the subscription signal is received.

While specific embodiments of the invention have been shown and described, modifications may be made, and it is intended in the appended claims to cover all such modifications as fall within the true spirit and scope of the invention.

I claim:

1. A wave-signal receiver for utilizing a coded modulated electrical signal and for concurrently utilizing a key signal to decode the coded signal, said receiver comprising: an intelligence-reproducing device; circuit means for demodulating said electrical signal and for utilizing the demodulated signal to actuate said reproducing device; decoding apparatus coupled to said circuit means and responsive to said key signal for decoding said coded signal; a network coupled to said circuit means and responsive to said coded signal for disabling said reproducing device during reception of said coded signal by said receiver; and a control circuit coupled between said circuit means and said network and responsive to said key signal for disabling said network.

2. A wave-signal receiver for utilizing a coded modulated electrical signal including a blanking-signal component and for concurrently utilizing a key signal to decode the coded signal, said receiver comprising: an intelligence-reproducing device; circuit means for demodulating said electrical signal and for utilizing the demodulated signal to actuate said reproducing device; decoding apparatus coupled to said circuit means and responsive to said key signal for decoding said coded signal; a network coupled to said reproducing device and responsive to an applied signal for disabling said reproducing device; a filter circuit coupled to said circuit means for applying said blanking-signal component to said network to actuate said network; and a control circuit coupled between said circuit means and said network and responsive to said key signal for disabling said network.

3. In a wave-signal receiver including a tuning device for tuning said receiver to utilize a coded modulated electrical signal, said receiver concurrently utilizing a key signal to decode the coded signal: an intelligence-reproducing device; circuit means for demodulating said electrical signal and for utilizing the demodulated signal to actuate said reproducing device; decoding apparatus coupled to said circuit means and responsive to said key signal for decoding said coded signal; a switching device mechanically coupled to said tuning device; a network coupled to said reproducing device and controlled by said switching device for disabling said reproducing device when said receiver is tuned to receive said coded signal; and a control circuit coupled between said circuit means and said network and responsive to said key signal for disabling said network.

ALEXANDER ELLETT.

References Cited in the file of this patent

UNITED STATES PATENTS

| Number | Name | Date |
|---|---|---|
| 2,251,525 | Rosenthal | Aug. 5, 1941 |
| 2,306,435 | Graham | Dec. 29, 1942 |
| 2,307,728 | Mertz | Jan. 5, 1943 |
| 2,392,672 | Koch | Jan. 8, 1946 |
| 2,402,067 | Mathes | June 11, 1946 |
| 2,405,252 | Goldsmith | Aug. 6, 1946 |
| 2,406,811 | Deloraine | Sept. 3, 1946 |
| 2,414,101 | Hogan | Jan. 14, 1947 |
| 2,419,568 | Labin | Apr. 29, 1947 |
| 2,472,774 | Mayle | June 7, 1949 |
| 2,480,115 | Brown | Aug. 30, 1949 |
| 2,546,987 | Eannarino | Apr. 3, 1951 |
| 2,547,598 | Roschke | Apr. 3, 1951 |

FOREIGN PATENTS

| Number | Country | Date |
|---|---|---|
| 386,849 | Great Britain | Jan. 26, 1933 |